US010097608B2

(12) United States Patent
Chowdhury et al.

(10) Patent No.: US 10,097,608 B2
(45) Date of Patent: Oct. 9, 2018

(54) TECHNOLOGIES FOR WIRELESS TRANSMISSION OF DIGITAL MEDIA

(71) Applicant: Intel Corporation, Santa Clara, CA (US)

(72) Inventors: Rajneesh Chowdhury, Beaverton, OR (US); Karthik Veeramani, Hillsboro, OR (US); Brian E. Rogers, Aloha, OR (US); Ujwal Paidipathi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/998,312

(22) Filed: Dec. 26, 2015

(65) Prior Publication Data

US 2017/0187773 A1 Jun. 29, 2017

(51) Int. Cl.
*H04L 29/06* (2006.01)
(52) U.S. Cl.
CPC .................. *H04L 65/601* (2013.01)
(58) Field of Classification Search
CPC . H04L 65/80; H04L 65/4076; H04L 65/4084; H04L 65/4092; H04L 65/601;
(Continued)

(56) References Cited

U.S. PATENT DOCUMENTS 6,728,775 B1 * 4/2004 Chaddha ............... G06T 9/40
375/E7.092
7,725,912 B2 * 5/2010 Margulis ............. H04L 12/2812
725/80

(Continued)

FOREIGN PATENT DOCUMENTS

CN 107743709 A * 2/2018 ......... H04N 21/4122
WO WO 2009064165 A2 * 5/2009 ............. H04L 12/18
(Continued)

OTHER PUBLICATIONS

Lei et al., Rate Adaptation Transcoding for Video Streaming Over Wireless Channels, Jul. 9, 2003, 2003 International Conference on Multimedia and Expo, vol. 2, pp. 433-436 (Year: 2003).*
Yoon et al., Low-cost Video Transcoding at the Wireless Edge, Oct. 28, 2016, 2016 IEEE/ACM Symposium on Edge Computing (Year: 2016).*
International search report for PCT application No. PCT/US2016/063576, dated Mar. 3, 2017 (3 pages).
(Continued)

*Primary Examiner* — Eric Nowlin
(74) *Attorney, Agent, or Firm* — Barnes & Thornburg LLP

(57) ABSTRACT

Technologies for wireless transmission of digital media include a wireless retransmission hub configured to receive an input digital media stream from a source computing device. The wireless retransmission hub is further configured to transmit a list of available destination computing devices to the source computing device, receive a list of selected destination computing devices from the source computing device, and map each destination computing devices of the list of selected destination computing devices to the source computing device. The wireless retransmission hub is further configured to transmit an output digital media stream to each of the selected destination computing devices of the list of selected destination computing devices, wherein the output digital media stream includes the digital media of the input digital media stream. Other embodiments are described and claimed herein.

18 Claims, 7 Drawing Sheets

(58) Field of Classification Search
CPC ... H04L 65/602; H04L 65/607; H04L 65/608; H04L 12/18; H04L 12/185; H04L 12/189; H04L 65/189; H04L 65/60; H04L 67/02; H04W 12/04
See application file for complete search history.

(56) References Cited

U.S. PATENT DOCUMENTS

| | | | | |
|---|---|---|---|---|
| 8,018,955 B2* | 9/2011 | Agarwal | H04W 4/02 | 370/235 |
| 8,064,448 B2* | 11/2011 | Simon | H04L 12/189 | 370/390 |
| 8,374,113 B2* | 2/2013 | Meier | H04W 4/06 | 370/312 |
| 8,427,938 B2* | 4/2013 | Atreya | G06F 11/2023 | 370/217 |
| 8,458,362 B2* | 6/2013 | Holden | H04N 21/23439 | 709/217 |
| 8,521,141 B2* | 8/2013 | Aguirre | H04W 48/10 | 455/414.1 |
| 8,619,662 B2* | 12/2013 | Kish | H04L 45/16 | 370/312 |
| 8,731,594 B2* | 5/2014 | Ponnuswamy | | 370/241 |
| 8,842,685 B2* | 9/2014 | Um | H04L 12/189 | 370/312 |
| 8,848,590 B2* | 9/2014 | Kakani | H04L 12/185 | 370/312 |
| 8,867,539 B2* | 10/2014 | Glasser | H04L 12/1836 | 370/390 |
| 9,019,886 B2* | 4/2015 | Kish | H04L 45/16 | 370/254 |
| 9,042,449 B2* | 5/2015 | Joch | H04N 19/40 | 375/240.12 |
| 9,137,202 B2* | 9/2015 | Nguyen | H04L 12/18 | |
| 9,137,286 B1* | 9/2015 | Yuan | H04L 65/605 | |
| 9,185,004 B2* | 11/2015 | Salinger | H04L 41/5019 | |
| 9,215,498 B2* | 12/2015 | Liu | H04L 1/007 | |
| 9,258,587 B2* | 2/2016 | Reddy | H04N 21/25841 | |
| 9,264,743 B1* | 2/2016 | Diep | H04N 21/23430 | |
| 9,307,289 B2* | 4/2016 | Rao | H04N 21/4402 | |
| 9,319,753 B2* | 4/2016 | Zhu | H04N 21/6587 | |
| 9,350,827 B2* | 5/2016 | Glasser | H04L 12/1836 | |
| 9,356,817 B2* | 5/2016 | Agarwal | H04L 29/0653 | |
| 9,356,981 B2* | 5/2016 | Macinnis | H04L 65/4084 | |
| 9,392,295 B2* | 7/2016 | Bennett | H04N 19/12 | |
| 9,456,253 B2* | 9/2016 | Murphy | H04N 21/64322 | |
| 9,479,816 B2* | 10/2016 | Rao | H04N 21/4402 | |
| 9,491,784 B2* | 11/2016 | Dave | H04W 76/002 | |
| 9,509,596 B2* | 11/2016 | Bergman | H04L 45/34 | |
| 9,516,139 B2* | 12/2016 | Nguyen | H04L 12/18 | |
| 9,571,609 B2* | 2/2017 | Glasser | H04L 12/1836 | |
| 9,596,283 B2* | 3/2017 | Holden | H04N 21/23439 | |
| 9,628,405 B2* | 4/2017 | Dasher | H04L 47/801 | |
| 9,756,098 B2* | 9/2017 | Kazerani | H04L 65/4076 | |
| 2007/0002858 A1* | 1/2007 | Bichot | H04L 12/1836 | 370/390 |
| 2008/0059647 A1 | 3/2008 | Jabri | | |
| 2008/0062923 A1* | 3/2008 | Ponnuswamy | H04W 72/005 | 370/331 |
| 2008/0062948 A1* | 3/2008 | Ponnuswamy | H04W 28/18 | 370/342 |
| 2008/0158337 A1* | 7/2008 | Richardson | H04L 12/185 | 348/14.09 |
| 2008/0186962 A1* | 8/2008 | Sinha | H04L 12/185 | 370/389 |
| 2008/0201484 A1* | 8/2008 | Sano | G06Q 30/02 | 709/232 |
| 2008/0235746 A1 | 9/2008 | Peters et al. | | |
| 2009/0100190 A1 | 4/2009 | Besombe et al. | | |
| 2009/0290575 A1* | 11/2009 | Simon | H04L 12/189 | 370/352 |
| 2010/0293043 A1* | 11/2010 | Atreya | G06F 11/2023 | 705/14.4 |
| 2011/0069652 A1* | 3/2011 | Kakani | H04L 12/185 | 370/312 |
| 2011/0069705 A1* | 3/2011 | Glasser | H04L 12/1836 | 370/390 |
| 2011/0096712 A1* | 4/2011 | Kish | H04L 45/16 | 370/312 |
| 2011/0252451 A1* | 10/2011 | Turgeman | H04N 21/41407 | 725/82 |
| 2011/0255458 A1* | 10/2011 | Chen | H04L 12/1863 | 370/312 |
| 2011/0268010 A1* | 11/2011 | Yamada | H04B 7/15557 | 370/312 |
| 2011/0299448 A1* | 12/2011 | Meier | H04W 4/06 | 370/312 |
| 2012/0084463 A1* | 4/2012 | Holden | H04N 21/23439 | 709/246 |
| 2012/0124633 A1* | 5/2012 | Lu | H04N 21/2343 | 725/114 |
| 2012/0173746 A1* | 7/2012 | Salinger | H04L 41/5019 | 709/230 |
| 2012/0192031 A1* | 7/2012 | Liu | H04L 1/007 | 714/752 |
| 2012/0269111 A1* | 10/2012 | Um | H04L 12/189 | 370/312 |
| 2012/0317235 A1* | 12/2012 | Nguyen | H04L 12/18 | 709/219 |
| 2013/0072167 A1* | 3/2013 | Aguirre | H04W 48/10 | 455/414.1 |
| 2013/0083843 A1* | 4/2013 | Bennett | H04N 19/12 | 375/240.02 |
| 2013/0083848 A1* | 4/2013 | Joch | H04N 19/40 | 375/240.12 |
| 2013/0268986 A1* | 10/2013 | Venkatachalam | H04N 21/2365 | 725/109 |
| 2013/0279599 A1* | 10/2013 | Wang | H04N 19/00139 | 375/240.25 |
| 2013/0286921 A1* | 10/2013 | Agarwal | H04L 29/0653 | 370/312 |
| 2013/0297746 A1* | 11/2013 | Holden | H04N 21/23439 | 709/219 |
| 2013/0305297 A1* | 11/2013 | Jabara | H04N 21/2365 | 725/75 |
| 2013/0308635 A1* | 11/2013 | Chen | H04N 21/2662 | 370/390 |
| 2014/0026174 A1* | 1/2014 | Baykal | H04N 21/4384 | 725/111 |
| 2014/0040420 A1* | 2/2014 | Dave | H04W 76/002 | 709/217 |
| 2014/0149539 A1* | 5/2014 | Macinnis | H04L 65/4084 | 709/217 |
| 2014/0157298 A1* | 6/2014 | Murphy | H04N 21/64322 | 725/14 |
| 2014/0177511 A1* | 6/2014 | Kish | H04W 4/06 | 370/312 |
| 2014/0230632 A1 | 8/2014 | Igoe | | |
| 2014/0254464 A1* | 9/2014 | Ponnuswamy | H04W 28/18 | 370/312 |
| 2014/0282777 A1* | 9/2014 | Gonder | H04L 65/605 | 725/109 |
| 2014/0337903 A1* | 11/2014 | Zhu | H04N 21/6587 | 725/90 |
| 2015/0039777 A1* | 2/2015 | Glasser | H04L 12/1836 | 709/230 |
| 2015/0089074 A1* | 3/2015 | Oyman | H04L 65/608 | 709/231 |
| 2015/0249867 A1* | 9/2015 | Wang | H04L 67/10 | 725/110 |
| 2015/0264359 A1* | 9/2015 | Vanam | H04N 21/2343 | 375/240.27 |
| 2015/0288617 A1* | 10/2015 | Dasher | H04L 47/801 | 709/226 |
| 2015/0319497 A1* | 11/2015 | Rao | H04N 21/4402 | 725/28 |
| 2015/0350866 A1 | 12/2015 | Patil et al. | | |

(56) References Cited

U.S. PATENT DOCUMENTS

| | | | | |
|---|---|---|---|---|
| 2015/0381764 | A1* | 12/2015 | Nguyen | H04L 12/18 |
| | | | | 709/226 |
| 2015/0382245 | A1* | 12/2015 | Cao | H04L 41/5041 |
| | | | | 370/328 |
| 2016/0182936 | A1* | 6/2016 | Rao | H04N 21/4402 |
| | | | | 725/25 |
| 2016/0192030 | A1* | 6/2016 | Zhu | H04N 21/6587 |
| | | | | 725/90 |
| 2016/0241679 | A1* | 8/2016 | Glasser | H04L 12/1836 |
| 2016/0255171 | A1* | 9/2016 | Salinger | H04L 41/5019 |
| 2016/0337684 | A1* | 11/2016 | Rao | H04N 21/4402 |
| 2016/0381431 | A1* | 12/2016 | Patterson | H04N 21/6405 |
| | | | | 725/110 |
| 2017/0013321 | A1* | 1/2017 | Murphy | H04N 21/64322 |
| 2017/0126491 | A1* | 5/2017 | Oedlund | H04L 41/0806 |
| 2017/0187773 | A1* | 6/2017 | Chowdhury | H04L 65/601 |
| 2017/0311008 | A1* | 10/2017 | Petersen | H04N 21/2387 |
| 2017/0339206 | A1* | 11/2017 | Holden | H04L 65/604 |
| 2018/0041934 | A1* | 2/2018 | Agarwal | H04W 36/14 |
| 2018/0103276 | A1* | 4/2018 | Piron | H04N 21/2343 |

FOREIGN PATENT DOCUMENTS

| | | | | |
|---|---|---|---|---|
| WO | WO 2016193052 A1 | * | 12/2016 | H04L 65/605 |
| WO | WO-2016205000 A1 | * | 12/2016 | H04N 21/4122 |

OTHER PUBLICATIONS

Written opinion for PCT application No. PCT/US2016/063576, dated Mar. 3, 2017 (9 pages).

* cited by examiner

TECHNOLOGIES FOR WIRELESS TRANSMISSION OF DIGITAL MEDIA

BACKGROUND

Traditionally, playback of digital media content (e.g., movies, music, pictures, games, etc.) has been constrained to the computing device (e.g., desktop computer, smartphone, tablet, wearable, gaming system, television, etc.) on which the digital media content was stored. However, with the advent of cloud computing related technologies and increased capabilities of computing devices, services such as digital media content transmission services (i.e., streaming, casting, mirroring, etc.) have spurred along the generation, sharing, and consumption of digital media content as consumer devices capable of interacting with such content have become ubiquitous. The desire to share digital media content between consumer interfacing computing devices, such as in home, office, and classroom environments, is increasing in tandem with the increased exposure of consumers to the digital media content and providers of such digital media content.

The introduction of stream-enabled computing devices has enabled digital media content to be streamed, casted, or mirrored from one computing device (e.g., a smartphone, a laptop, etc.) to one or more other compatible computing devices (e.g., laptops, tablets, wearables, smart televisions, speakers, etc.) directly, or indirectly, such as via a compatible hub, dongle, etc., connected to the other computing device. In other words, digital media content stored on a source computing device can be transmitted to one or more destination computing devices and received/rendered at the respective destination computing device(s). One such present solution is multicasting, in which the source computing device broadcasts a single digital media transmission stream to a group of destination computing devices. However, since the digital media is being transmitted through a single stream and all of the destination computing devices may not have the same or similar capabilities, the source computing device is restricted to transmitting the digital media stream using the lowest common minimum parameters (e.g., Wi-Fi capabilities, digital media types, graphic processing capabilities, etc.) as determined between all of the destination computing devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
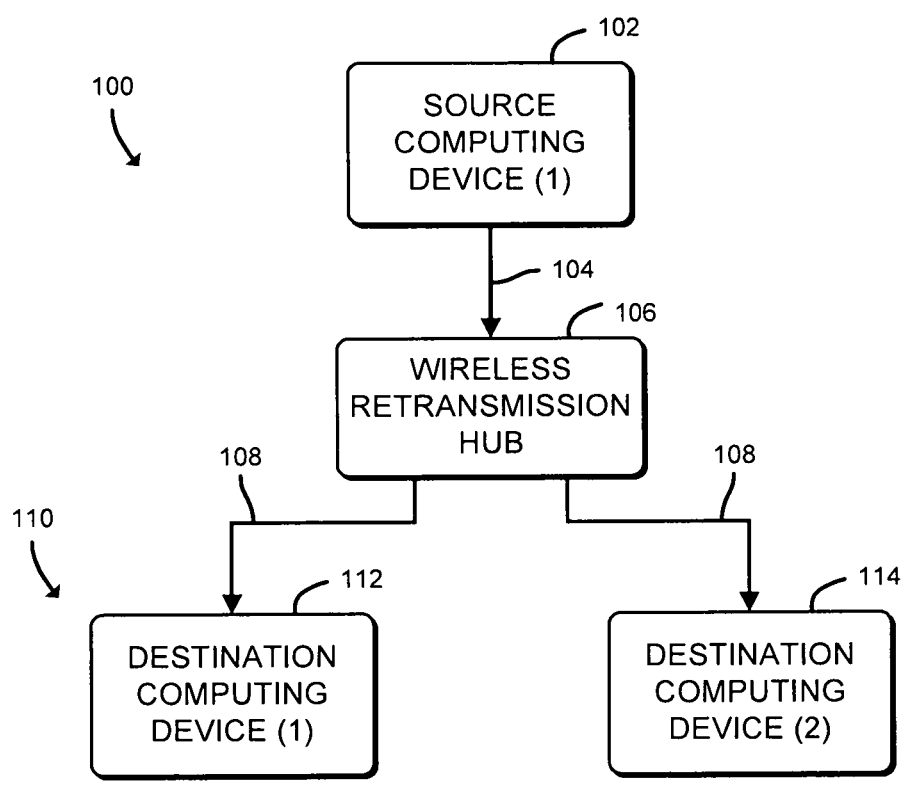
FIG. 1 is a simplified block diagram of at least one embodiment of a system for wireless transmission of a single stream of digital media from a source computing device to multiple destination computing devices via a wireless retransmission hub.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for wireless transmission of digital media (e.g., video, audio, text, etc.) includes a source computing device (1) 102 communicatively coupled to a plurality of destination computing devices 110 via a wireless retransmission hub 106. In use, the source computing device (1) 102 transmits (e.g., casts, streams, mirrors, etc.) an input digital media stream 104 to the wireless retransmission hub 106 via a communication channel established between the source computing device (1) 102 and the wireless retransmission hub 106. The wireless retransmission hub 106 is configured to receive the digital media (e.g., via the input digital media stream 104) from the source computing device (1) 102 and transmit an output digital media stream 108 that includes the received digital media to the destination computing devices 110 via communication channels established between the wireless retransmission hub 106 and each of the destination computing devices 110. Further, the wireless retransmission hub 106 is configured to transmit the output digital media stream 108 (i.e., digital media of the input digital media stream 104) as-is (i.e., unchanged) or transcode the received digital media of the input digital media stream 104 prior to transmission of the output digital media stream 108 based on one or more capabilities of each of the destination computing devices 110.

It should be appreciated that, regardless of whether the digital media was transmitted as-is or transcoded prior to transmission to each of the destination computing devices 110, the output digital media stream 108 that is transmitted to each of the destination computing devices 110 contains the same digital media of the input digital media stream 104, though the digital media of the output digital media stream 108 may be transmitted in different formats. For example, the illustrative destination computing devices 110 includes a first destination computing device, which is designated as destination computing device (1) 112, and a second destination computing device, which is designated as destination computing device (2) 114. Accordingly, in such an embodiment, each of the destination computing device (1) 112 and the destination computing device (2) 114 may have different digital media display capabilities (i.e., capabilities relating to the processing, rendering, and/or display of the digital media); however, each of the destination computing device (1) 112 and the destination computing device (2) 114 are to receive the same digital media via the output digital media stream 108. In other words, the digital media may be transmitted to each of the destination computing device (1) 112 and the destination computing device (2) 114 in different formats, such that compatibility limitations at each of the destination computing devices 110 are accounted for prior to transmission of the digital media.

Figure 2:
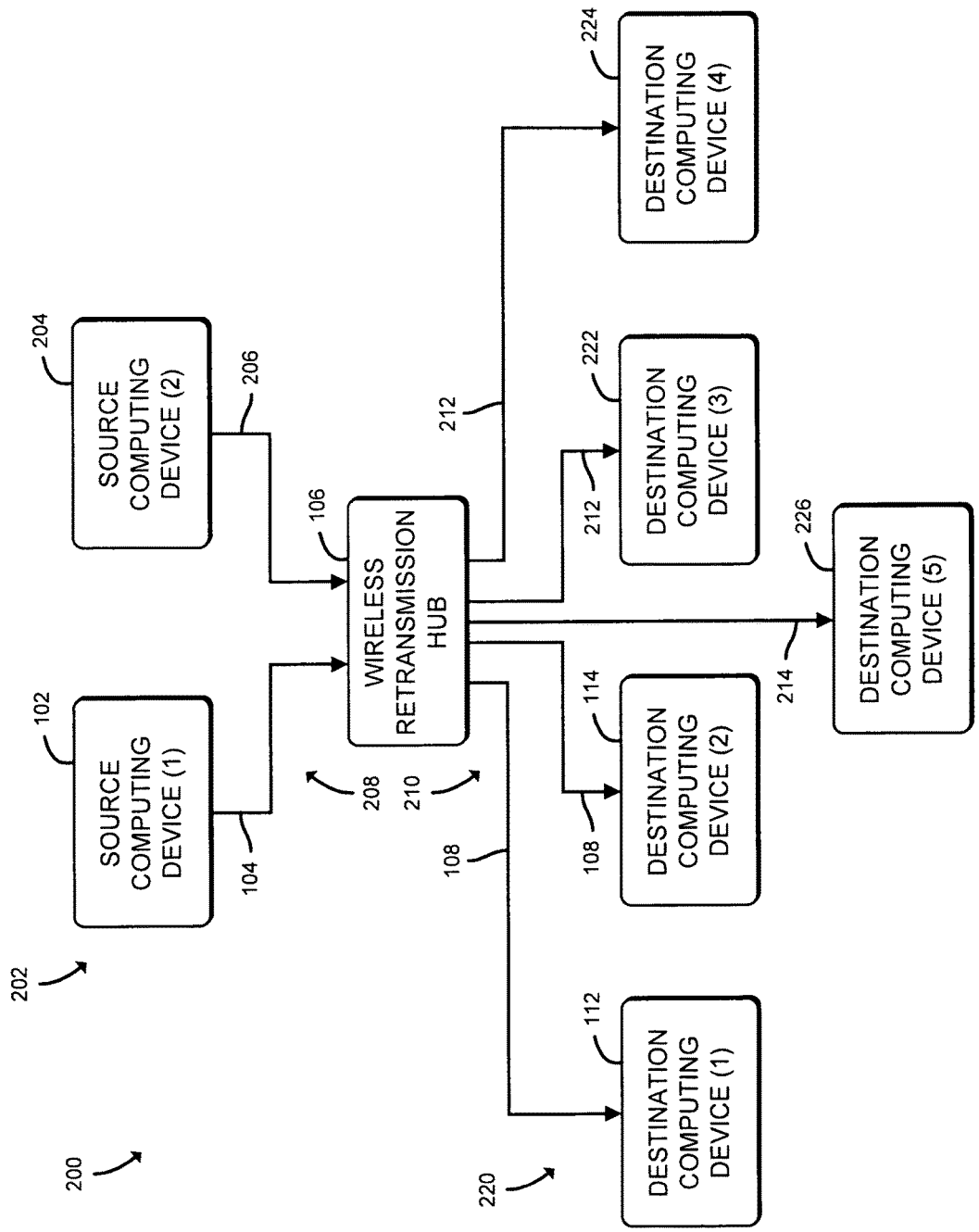
FIG. 2 is a simplified block diagram of at least one embodiment of a system for wireless transmission of multiple streams of digital media from multiple source computing devices to multiple destination computing devices via the wireless retransmission hub.

In contrast, referring now to FIG. 2, in an illustrative embodiment, another system 200 for wireless transmission of digital media includes a plurality of source computing devices 202 and a plurality of destination computing devices 220 coupled to the wireless retransmission hub 106. The plurality of source computing devices 202 includes the source computing device (1) 102 of FIG. 1, and a second source computing device, which is designated as destination computing device (2) 204. Each of the source computing devices 202 transmits its own input digital media stream, as indicated by the input digital media streams 208 (i.e., the input digital media stream 104 and the input digital media stream 206). As described previously, the source computing device (1) transmits the input digital media stream 104 to the wireless retransmission hub 106 via a previously established communication channel. Similarly, the destination computing device (2) 204 transmits an input digital media stream 206 to the wireless retransmission hub 106 via a previously established communication channel. It should be appreciated that each of the input digital media streams 208 includes different digital media being transmitted by their respective source computing devices 202.

The plurality of destination computing devices 220 includes the destination computing device (1) 112 and the destination computing device (2) 114 of FIG. 1, as well as a third destination computing device, designated as destination computing device (3) 222, a fourth destination computing device, designated as destination computing device (4) 224, and a fifth destination computing device, designated as destination computing device (5) 226. As described previously, the wireless retransmission hub 106 is configured to receive digital media via an input digital media stream (e.g., the input digital media stream 104, the input digital media stream 206, etc.) from the source computing devices 202 and transmit one or more output digital media streams to the destination computing devices 110 via communication channels established between the wireless retransmission hub 106 and each of the destination computing devices 220.

In the illustrative system 200, a plurality of output digital media streams 210 includes the output digital media stream 108 of FIG. 1, an output digital media stream 212, and an output digital media stream 214. As described previously, the output digital media stream 108 includes the digital media of the input digital media stream 104. Similarly, the output digital media stream 212 includes the digital media of the input digital media stream 206. As shown, the output digital media stream 212 is transmitted to the destination computing device (3) 222 and the destination computing device (4) 224. As such, it should be appreciated that while the same digital media content as received in the input digital media stream 206 is transmitted in the output digital media stream 212, the output digital media stream 212 transmitted to the destination computing device (3) 222 and the destination computing device (4) 224 may include different formatting, or transcoding, based on one or more different digital media display capabilities of the destination computing device (3) 222 and the destination computing device (4) 224.

The output digital media stream 214 includes both the digital media of the input digital media stream 104 and the digital media of the input digital media stream 206. In other words, the wireless retransmission hub 106 is configured to compose the input digital media stream 104 and the digital media of the input digital media stream 206 together (e.g., side-by-side), and transmit the composed output digital media stream 214 as a single output stream to the destination computing device (5) 226.

Figure 3:
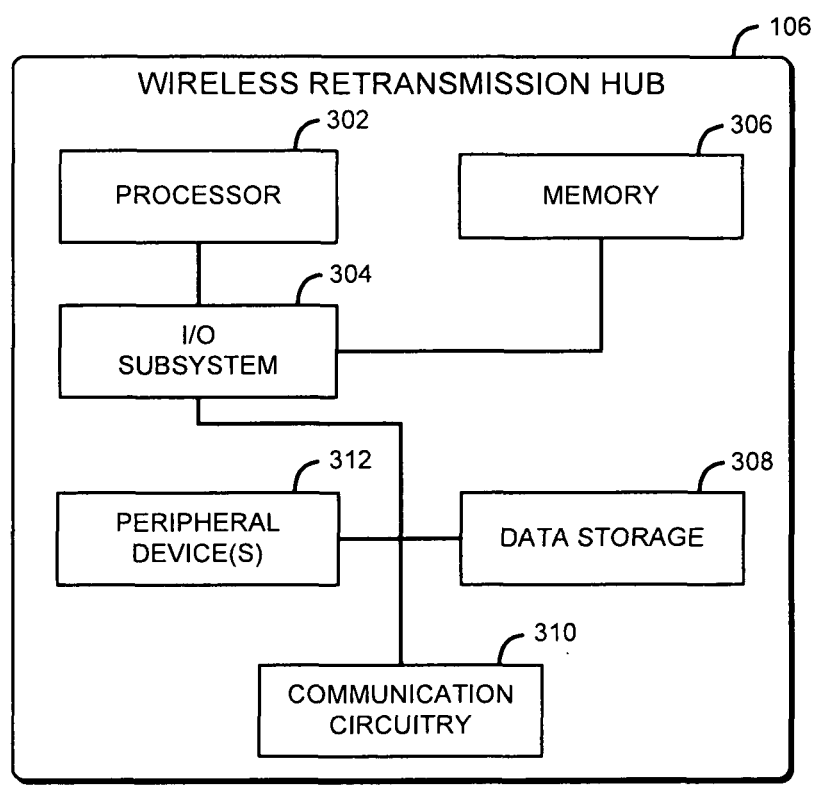
FIG. 3 is a simplified block diagram of at least one embodiment of the wireless retransmission hub of the systems of FIGS. 1 and 2.

The wireless retransmission hub 106 may be embodied as any type of device or devices capable of performing the functions described herein. As shown in FIG. 3, the illustrative wireless retransmission hub 106 includes a processor 302, an input/output (I/O) subsystem 304, a memory 306, a data storage device 308, communication circuitry 310, and one or more peripheral devices 312. Of course, in other embodiments, the wireless retransmission hub 106 may include other or additional components, such as those commonly found in a computing device. Further, in some embodiments, one or more of the illustrative components may be omitted from the wireless retransmission hub 106. Additionally, in some embodiments, one or more of the illustrative components may be incorporated in, or otherwise form a portion of, another component. For example, the memory 306, or portions thereof, may be incorporated in the processor 302, in some embodiments.

The processor 302 may be embodied as any type of processor capable of performing the functions described herein. For example, the processor 302 may be embodied as a single or multi-core processor(s), digital signal processor, microcontroller, or other processor or processing/controlling circuit. The memory 306 may be embodied as any type of volatile or non-volatile memory or data storage capable of performing the functions described herein. In operation, the memory 306 may store various data and software used during operation of the wireless retransmission hub 106, such as operating systems, applications, programs, libraries, and drivers.

The memory 306 is communicatively coupled to the processor 302 via the I/O subsystem 304, which may be embodied as circuitry and/or components to facilitate input/output operations with the processor 302, the memory 306, and other components of the wireless retransmission hub 106. For example, the I/O subsystem 304 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 304 may form a portion of a system-on-a-chip (SoC) and be incorporated, along with the processor 302, the memory 306, and/or other components of the wireless retransmission hub 106, on a single integrated circuit chip.

The data storage device 308 may be embodied as any type of device or devices configured for short-term or long-term storage of data, such as memory devices and circuits, memory cards, hard disk drives, solid-state drives, or other data storage devices, for example. It should be appreciated that the data storage device 308 and/or the memory 306 (e.g., the computer-readable storage media) may store various types of data capable of being executed by a processor (e.g., the processor 302) of the wireless retransmission hub 106, including operating systems, applications, programs, libraries, drivers, instructions, etc.

The communication circuitry 310 may be embodied as any communication circuit, device, or collection thereof, capable of enabling communications between the source computing devices 202 and the destination computing devices 220 over a wireless communication channel. For example, the communication circuitry 310 may include a network interface controller (NIC) and/or other devices capable of performing networking-related operations, which are not shown for clarity of the description. The communication circuitry 310 may be configured to use any one or more wireless communication technologies and associated protocols (e.g., Ethernet, Wi-Fi®, Bluetooth®, Bluetooth® Low Energy (BLE), near-field communication (NFC), Worldwide Interoperability for Microwave Access (WiMAX), Digital Living Network Alliance (DLNA), etc.) to affect such communication. The communication circuitry 310 may be additionally configured to use any one or more wireless and/or wired communication technologies and associated protocols to effect communication with other computing devices, such as over a network, for example.

The peripheral devices 312 may include any number of input/output devices, interface devices, and/or other peripheral devices. For example, in some embodiments, the peripheral devices 312 may include a display, a touch screen, graphics circuitry, a keyboard, a mouse, a microphone, a speaker, and/or other input/output devices, interface devices, and/or peripheral devices. The particular devices included in the peripheral devices 312 may depend on, for example, the type and/or intended use of the wireless retransmission hub 106. The peripheral devices 312 may additionally or alternatively include one or more ports, such as a USB port, for example, for connecting external peripheral devices to the wireless retransmission hub 106.

The source computing devices 202 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, an appliance, a television, a processor-based system, a multiprocessor system, and/or any other computing/communication device. Similarly, the destination computing devices 220 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, an appliance, a television, a projector, a speaker, an entertainment system, a dongle, a processor-based system, a multiprocessor system, and/or any other computing/communication device.

It should be appreciated that the source computing devices 202 and the destination computing devices 220 may include like components to those of the illustrative wireless retransmission hub 106 of FIG. 3. As such, further descriptions of the like components are not repeated herein with the understanding that the description of the corresponding components provided above in regard to the illustrative wireless retransmission hub 106 of FIG. 3 applies equally to the corresponding components of the source computing devices 202 and the destination computing devices 220.

Each of the modules, logic, and other components of the environment 400 may be embodied as hardware, software, firmware, or a combination thereof. For example, each of the modules, logic, and other components of the environment 400 may form a portion of, or otherwise be established by, the processor 302, the memory 306, the communication circuitry 310, and/or other hardware components of the wireless retransmission hub 106. As such, in some embodiments, one or more of the modules of the environment 400 may be embodied as circuitry or a collection of electrical devices (e.g., communication management circuitry 410, source computing device management circuitry 420, source computing device stream reception circuitry 430, destination computing device management circuitry 440, destination computing device stream transmission circuitry 450, etc.).

Figure 4:
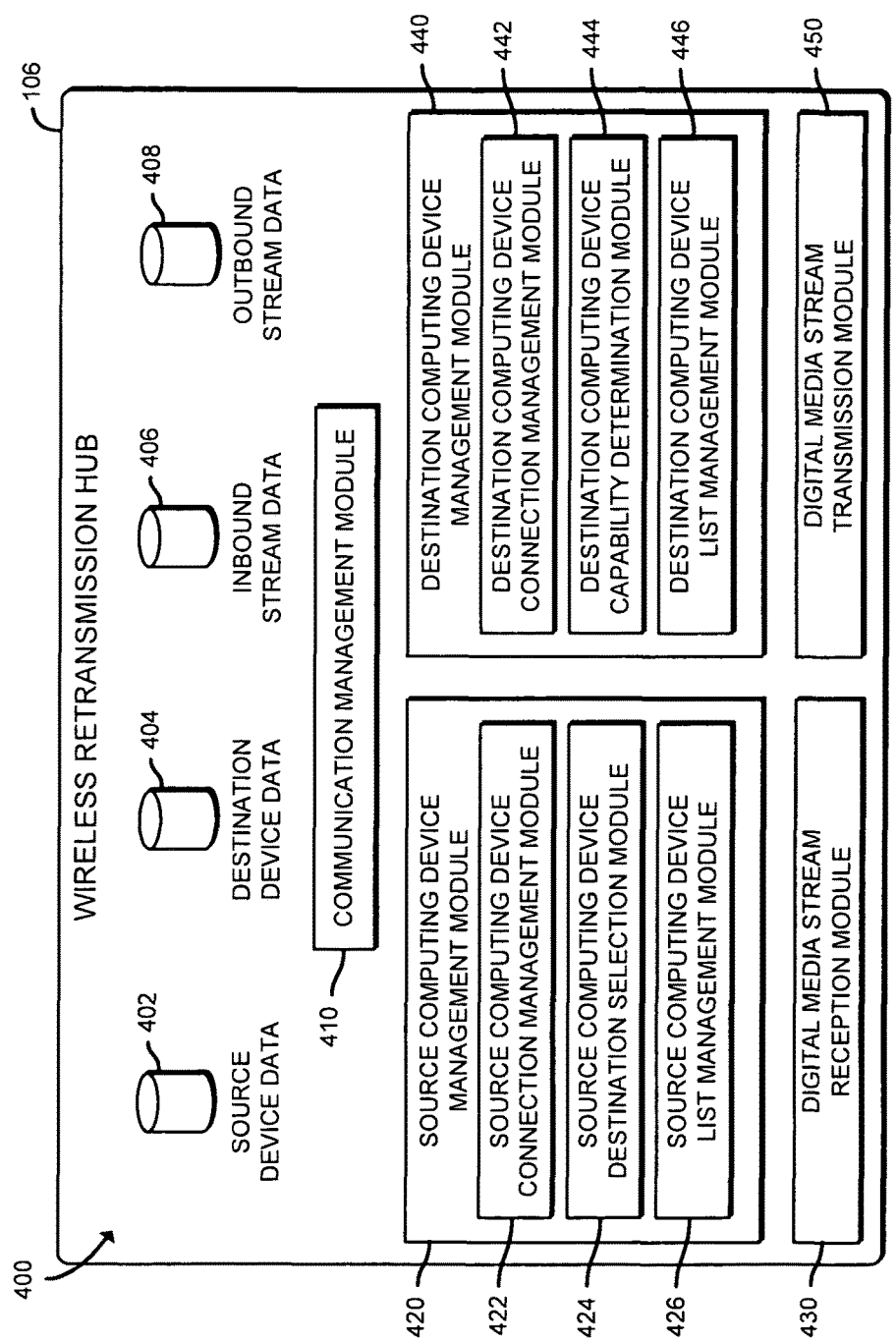
FIG. 4 is a simplified block diagram of at least one embodiment of an environment of the wireless retransmission hub of FIGS. 1-3.

Referring now to FIG. 4, in an illustrative embodiment, the wireless retransmission hub 106 establishes an environment 400 during operation. The illustrative environment 400 includes a communication management module 410, a source computing device management module 420, a digital media stream reception module 430, a destination computing device management module 440, and a digital media stream transmission module 450. The various modules of the environment 400 may be embodied as hardware, firmware, software, or a combination thereof. As such, in some embodiments, one or more of the modules of the environment 400 may be embodied as circuitry or collection of electrical devices (e.g., a communication management circuit 410, a source computing device management circuit 420, a digital media stream reception circuit 430, a destination computing device management circuit 440, a digital media stream transmission circuit 450, etc.).

It should be appreciated that, in such embodiments, one or more of the communication management circuit 410, the source computing device management circuit 420, the digital media stream reception circuit 430, the destination computing device management circuit 440, and the digital media stream transmission circuit 450 may form a portion of one or more of the processor 302, the I/O subsystem 304, and/or other components of the wireless retransmission hub 106. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor 302 or other components of the wireless retransmission hub 106.

In the illustrative environment 400, the wireless retransmission hub 106 further includes source device data 402, destination device data 404, inbound stream data 406, and outbound stream data 408, each of which may be stored in the memory 306 and/or the data storage device 308 of the wireless retransmission hub 106. Further, each of the source device data 402, the destination device data 404, the inbound stream data 406, and the outbound stream data 408 may be accessed by the various modules and/or sub-modules of the wireless retransmission hub 106. It should be appreciated that the wireless retransmission hub 106 may include additional and/or alternative components, sub-components, modules, sub-modules, and/or devices commonly found in a computing device, which are not illustrated in FIG. 4 for clarity of the description.

The communication management module 410, which may be embodied as hardware, firmware, software, virtualized hardware, emulated architecture, and/or a combination thereof as discussed above, is configured to facilitate inbound and outbound wireless network communications (e.g., network traffic, network packets, network flows, etc.) to and from the wireless retransmission hub 106. To do so, the communication management module 410 is configured to receive and process network packets from other computing devices (e.g., the source computing devices 202, the destination computing devices 220 and/or other computing device(s) communicatively coupled to the wireless retransmission hub 106). Additionally, the communication management module 410 is configured to prepare and transmit network packets to another computing device (e.g., the source computing devices 202, the destination computing devices 220 and/or other computing device(s) communicatively coupled to the wireless retransmission hub 106). To do so, the communication management module 410 is configured to establish communication channels with each of the communicatively coupled computing devices, such as may be established at the network layer (i.e., the IP layer). Accordingly, in some embodiments, at least a portion of the functionality of the communication management module 410 may be performed by the communication circuitry 310 of the wireless retransmission hub 106, or more specifically by a network interface controller (NIC) (not shown) of the communication circuitry 310.

The source computing device management module 420, which may be embodied as hardware, firmware, software, virtualized hardware, emulated architecture, and/or a combination thereof as discussed above, is configured to manage the source computing devices 202 connections to the wireless retransmission hub 106, as well as manage the reception of the input digital media streams associated with each of the connected source computing devices 202. To do so, the illustrative source computing device management module 420 includes a source computing device connection management module 422, a source computing device destination selection module 424, and a source computing device list management module 426.

It should be appreciated that each of the source computing device connection management module 422, the source computing device destination selection module 424, and the source computing device list management module 426 of the source computing device management module 420 may be separately embodied as hardware, firmware, software, virtualized hardware, emulated architecture, and/or a combination thereof. For example, the source computing device connection management module 422 may be embodied as a hardware component, while the source computing device destination selection module 424 and/or the source computing device list management module 426 is embodied as a virtualized hardware component or as some other combination of hardware, firmware, software, virtualized hardware, emulated architecture, and/or a combination thereof.

The source computing device connection management module 422 is configured to manage connections (i.e., communication channels) between the source computing devices 202 and the wireless retransmission hub 106. To do so, the source computing device connection management module 422 may be configured to perform a capability exchange with the source computing devices 202. For example, the source computing devices 202 may transmit a message requesting the wireless retransmission hub 106 whether the wireless retransmission hub 106 supports retransmission (i.e., confirming the wireless retransmission hub 106 is a wireless retransmission hub 106). As such, the source computing device connection management module 422 is configured to respond with a message that indicates the wireless retransmission hub 106 supports retransmission of the input digital media stream (i.e., functions as a wireless retransmission hub 106 as described herein).

The source computing device connection management module 422 is further configured collect connection information corresponding to the source computing devices 202, the connection, and/or the communication channel, which may be obtained during establishment of the connection/communication channel, such as an IP address, a port number, access credentials, a session key, etc., as well as other identifying information of the source computing device. In some embodiments, such information may be stored in the source device data 402.

The source computing device destination selection module 424 is configured to manage which connected destination computing devices are selected for reception of digital media for each connected source computing device. To do so, the source computing device destination selection module 424 is configured to retrieve a list of presently connected destination computing devices available for selection (e.g., not presently selected by another of the source computing devices 202). In some embodiments, the list of presently connected destination computing devices may be retrieved from the destination computing device list management module 446, described below.

The source computing device destination selection module 424 is additionally configured to transmit the list of presently connected destination computing devices to one of the source computing devices 202 (e.g., the source computing device (1) 102, the source computing device (2) 204) requesting the selection, either upon connection or subsequent to connection with the wireless retransmission hub 106, as may be requested by a connected source computing device. Further, the source computing device destination selection module 424 is configured to receive an indication from the source computing device indicating which connected destination computing devices the source computing device has selected. The source computing device destination selection module 424 may be further configured to pass such information to the destination computing device list management module 446 to update the mapping information described below.

The source computing device list management module 426 is configured to maintain a list of the connected source computing devices, as well as a list of active source computing devices. In other words, some connected source computing devices may be presently connected to the wireless retransmission hub 106 but not transmitting an input digital media stream to the wireless retransmission hub 106. Such connected source computing devices may be placed in the list of the connected source computing devices by the source computing device list management module 426, but not in the list of active source computing devices.

Further, the source computing device list management module 426 is configured to remove connected source computing devices when they are no longer connected (e.g., off, out of range, wireless communication disabled, etc.). Alternatively, other connected source computing devices may be presently transmitting an input digital media stream to the wireless retransmission hub 106, in which case such connected source computing devices are to be placed in the list of active source computing devices by the source computing device list management module 426 and removed by the source computing device list management module 426 when they are no longer transmitting the input digital media stream to the wireless retransmission hub 106. It should be appreciated that, in some embodiments, the list of the connected source computing devices and the list of active source computing devices may be maintained in a single list. For example, the source computing device list management module 426 may be configured to maintain a single list (e.g., a list of known source computing devices) that includes an indicator in the list indicative of a connection status and another indicator in the list that is indicative of an active status.

The digital media stream reception module 430, which may be embodied as hardware, firmware, software, virtualized hardware, emulated architecture, and/or a combination thereof as discussed above, is configured to receive the input digital media streams 210 associated with each of the connected source computing devices 202 presently transmitting an input digital media stream to the wireless retransmission hub 106 (e.g., in the list of active source computing devices 202). To do so, the digital media stream reception module 430 is configured to receive the input digital media stream(s) and perform any processing that may be required thereon. In some embodiments, the input digital media stream(s) and/or information relating thereto may be stored in the inbound stream data 406.

The destination computing device management module 440, which may be embodied as hardware, firmware, software, virtualized hardware, emulated architecture, and/or a combination thereof as discussed above, is configured to manage the connections to the wireless retransmission hub 106 from the destination computing devices 220, as well as manage the transmission of the output digital media streams 210 to the destination computing devices 220. To do so, the illustrative destination computing device management module 440 includes a destination computing device connection management module 442, a destination computing device capability determination module 444, and a destination computing device list management module 446.

It should be appreciated that each of the destination computing device connection management module 442, the destination computing device capability determination module 444, and the destination computing device list management module 446 of the destination computing device management module 440 may be separately embodied as hardware, firmware, software, virtualized hardware, emulated architecture, and/or a combination thereof. For example, the destination computing device connection management module 442 may be embodied as a hardware component, while the destination computing device capability determination module 444 and/or the destination computing device list management module 446 is embodied as a virtualized hardware component or as some other combination of hardware, firmware, software, virtualized hardware, emulated architecture, and/or a combination thereof.

The destination computing device connection management module 442 is configured to manage connections (i.e., communication channels) between the destination computing devices 220 and the wireless retransmission hub 106. Similar to the source computing device connection management module 422, the destination computing device connection management module 442 is further configured collect connection information corresponding to the destination computing devices 220. As described previously, the connection information may include an IP address, a port number, access credentials, a session key, etc., as well as other identifying information of the source computing device. In some embodiments, such information may be stored in the destination device data 404.

The destination computing device capability determination module 444 is configured to determine various digital media display capabilities of the connected destination computing devices, such as supported video codecs, supported resolutions, network port numbers, etc. The destination computing device capability determination module 444 is additionally configured to determine component capability information of the connected destination computing devices, including processor specifications (e.g., number of processor cores, clock speed, cache size, hyperthreading support, graphics processor specifications, etc.), memory specifications (e.g., total memory size, available memory size, etc.), and the like.

To do so, the destination computing device capability determination module 444 may be configured to perform a capability exchange with the of the connected destination computing devices. In such embodiments, the destination computing device capability determination module 444 may be configured to transmit a request message to the destination computing device requesting the digital media display capabilities of a particular destination computing device (i.e., one of the connected destination computing devices) and receive a response message from the destination computing device that includes the digital media display capabilities of the destination computing device.

The destination computing device list management module 446 is configured to maintain a list of the connected destination computing devices. To do so, the destination computing device list management module 446 may be configured to receive an indication from the destination computing device connection management module 442 indicating identifying information for each of the connected destination computing devices. The destination computing device list management module 446 is further configured to maintain mapping information indicative of which connected source computing device has selected which connected destination computing device to transmit digital media to. To do so, the destination computing device list management module 446 may be configured to receive an indication from the source computing device destination selection module 424 indicating which connected destination computing devices were selected by which connected source computing devices, as described above. Accordingly, based on the received selection information, the destination computing device list management module 446 can update the mapping information. In some embodiments, such mapping information may be stored in the destination device data 404.

The digital media stream transmission module 450, which may be embodied as hardware, firmware, software, virtualized hardware, emulated architecture, and/or a combination thereof as discussed above, is configured to generate and transmit the output digital media streams 210 to the respective connected destination computing devices based on which connected destination computing devices were selected by which connected source computing devices, as may be determined from the list maintained by the destination computing device list management module 446 as described above. As previously noted, it should be appreciated that each of the connected destination computing devices may have different digital media processing, rendering, and/or display capabilities.

As such, the digital media stream transmission module 450 is further configured to transcode the digital media of the respective input digital media stream based on the capabilities of the connected destination computing device to which the corresponding output digital media stream is being transmitted. Accordingly, in such embodiments wherein the input digital media stream has been transcoded, the digital media stream transmission module 450 if further configured to transmit the transcoded output digital media stream to the corresponding connected destination computing device. In some embodiments, the output digital media stream, the transcoded output digital media stream, and/or data relating thereto may be stored in the outbound stream data 408.

Figure 5:
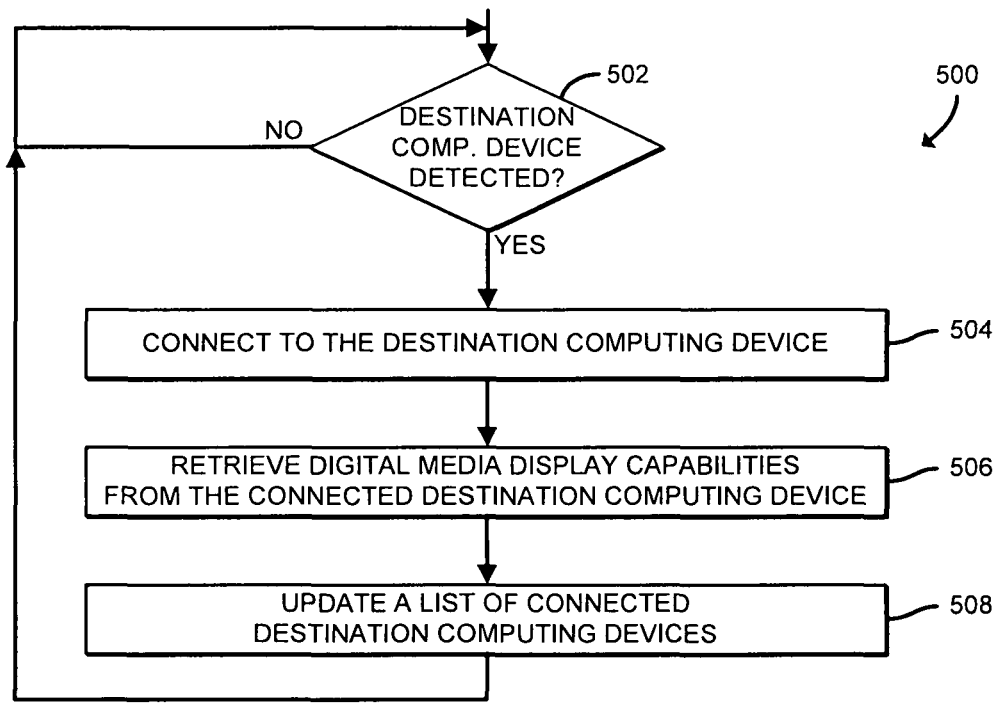
FIG. 5 is a simplified flow diagram of at least one embodiment for connecting to one or more destination computing devices that may be executed by the wireless retransmission hub of FIGS. 1-3.

Referring now to FIG. 5, in use, the wireless retransmission hub 106 may execute a method 500 for connecting to one or more destination computing devices (e.g., one or more of the destination computing devices 220). The method 500 begins in block 502, in which the wireless retransmission hub 106 determines whether a destination computing device has been detected. If so, the method 500 advances to block 504, in which the wireless retransmission hub 106 connects to the destination computing device.

In block 506, the wireless retransmission hub 106 retrieves one or more digital media display capabilities from the destination computing device. As described previously, the digital media display capabilities identify capabilities of the destination computing device relating to the processing, rendering, and/or display of the digital media, such as supported video codecs, supported resolutions, network port numbers, etc., as well as component capability information of the connected destination computing devices, including processor specifications (e.g., number of processor cores, clock speed, cache size, hyperthreading support, graphics processor specifications, etc.), memory specifications (e.g., total memory size, available memory size, etc.), and the like. In block 508, the wireless retransmission hub 106 updates a list of connected destination computing devices to include the destination computing device connected to in block 504.

Figure 6:
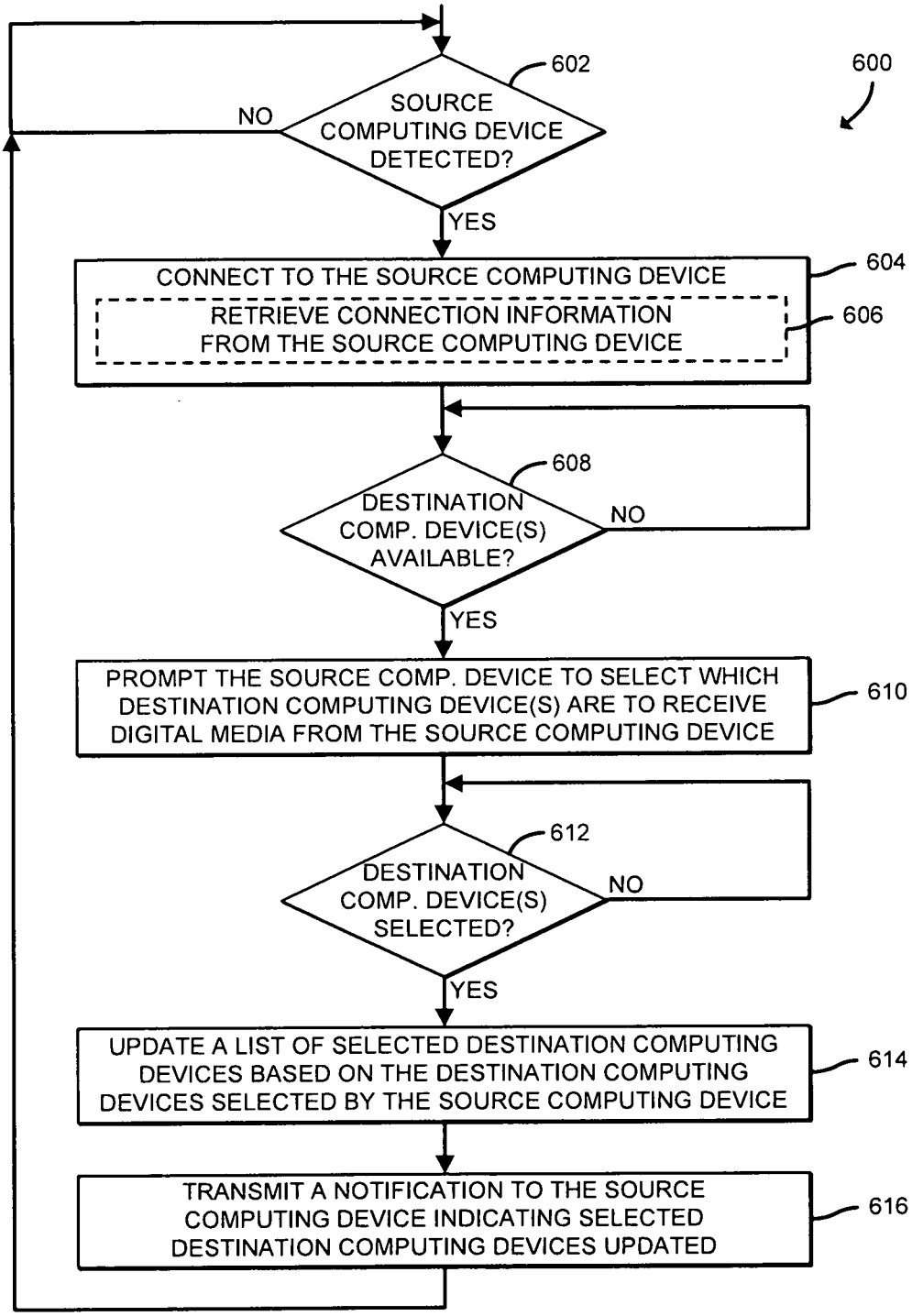
FIG. 6 is a simplified flow diagram of at least one embodiment for facilitating the selection of one or more destination computing devices by a source computing device that may be executed by the wireless retransmission hub of FIGS. 1-3.

Referring now to FIG. 6, in use, the wireless retransmission hub 106 may execute a method 600 for facilitating the selection of one or more destination computing devices 220 by a source computing device (e.g., the source computing device (1) 102, the source computing device (2) 204). The method 600 begins in block 602, in which the wireless retransmission hub 106 determines whether a source computing device that is not presently connected has been detected. If so, the method 600 advances to block 604, wherein the wireless retransmission hub 106 connects to the source computing device. As described previously, to do so may include performing a capability negotiation in which the wireless retransmission hub 106 indicates to the source computing device that the wireless retransmission hub 106 is capable of retransmission (i.e., capable of performing as a wireless retransmission hub 106). Further, in block 606, the wireless retransmission hub 106 retrieves connection information from the source computing device, which may be stored local to the wireless retransmission hub 106 for future use. As described previously, the connection information may include an IP address, a port number, access credentials, a session key, etc., as well as other identifying information of the source computing device.

In block 608, the wireless retransmission hub 106 determines whether any destination computing devices are available for selection. To do so, the wireless retransmission hub 106 may determine which destination computing devices are presently connected and, of those presently connected, which are not presently assigned (i.e., selected by) to another active source computing device. As described previously, in some embodiments, more than one input digital media stream may be assigned to one or more destination computing devices. In such embodiments, the wireless retransmission hub 106 may be configured to allow the source computing device to select a destination computing device that is presently assigned (i.e., selected by) to another active source computing device. However, in some embodiments, the wireless retransmission hub 106 may enforce a maximum number of active source computing devices that may be assigned to a single destination computing device.

If so, the method 600 advances to block 610, in which the wireless retransmission hub 106 prompts the source computing device to select which destination computing devices are to receive digital media. In other words, the wireless retransmission hub 106 prompts the source computing device to select which destination computing devices are to receive the digital media corresponding to the input digital media stream to be transmitted by the source computing device. In block 612, the wireless retransmission hub 106 determines whether any destination devices have been selected by the source computing device.

If so, the method 600 advances to block 614, in which the wireless retransmission hub 106 updates a list of selected destination computing devices based on the destination computing devices selected by the source computing node in block 612. In block 616, the wireless retransmission hub 106 transmits a notification to the source computing device indicating that the selected destination devices have been updated, and that the source computing device may not transmit a digital media stream (i.e., an input digital media stream) to the wireless retransmission hub 106. From block 612, the method 600 returns to block 602 to determine whether a source computing device that is not presently connected has been detected.

Figure 7:
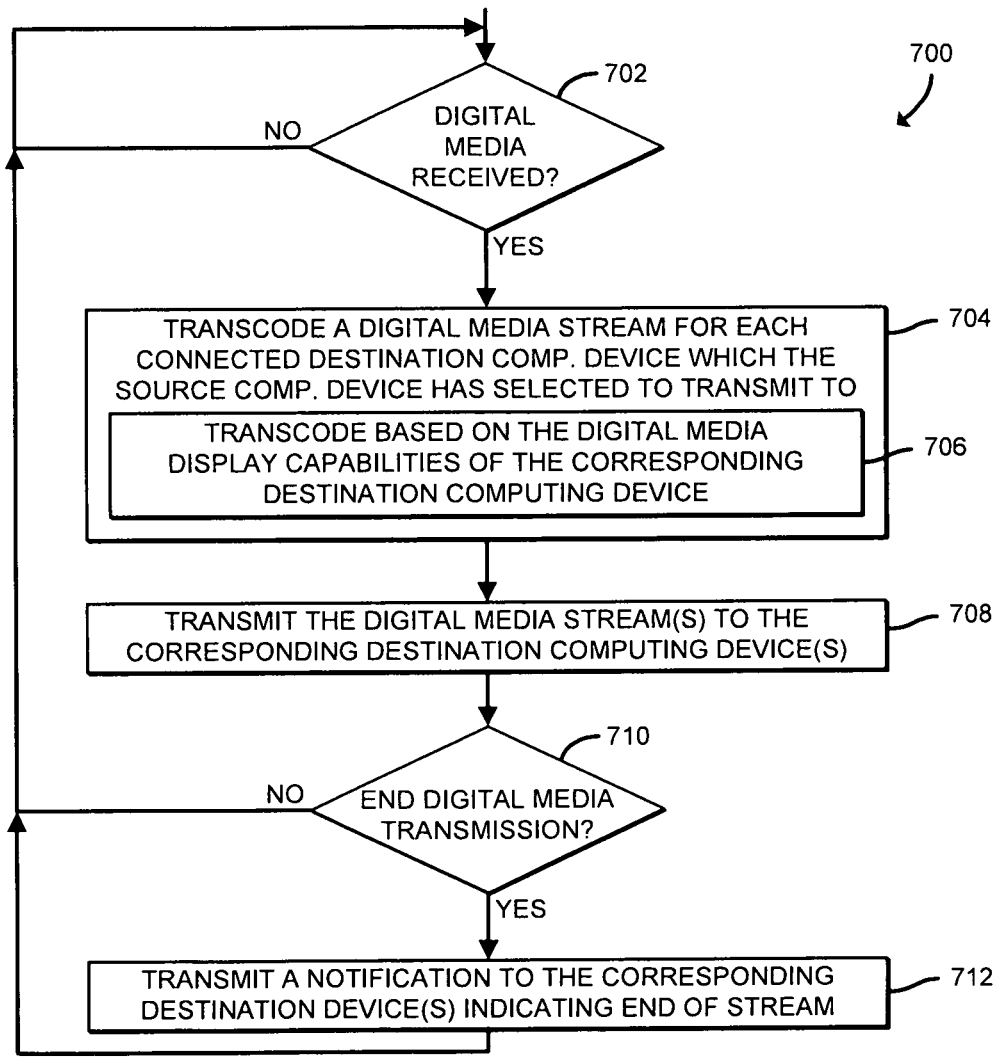
FIG. 7 is a simplified flow diagram of at least one embodiment for transmitting one or more digital media streams to multiple corresponding destination computing devices that may be executed by the wireless retransmission hub of FIGS. 1-3.

Referring now to FIG. 7, in use, the wireless retransmission hub 106 may execute a method 700 for transmitting one or more digital media streams to a corresponding plurality of destination computing devices. The method 700 begins in block 702, in which the wireless retransmission hub 106 determines whether digital media (i.e., an input digital media stream) has been received from a connected source computing device for retransmission. If so, the method 700 advances to block 704, in which the wireless retransmission hub 106 transcodes the content stream(s) for each of the connected destination computing devices mapped to (i.e., presently selected by) the source computing device from which the input digital media stream was received in block 702.

To do so, in block 706, the wireless retransmission hub 106 transcodes each of the content streams based on the digital media display capabilities of the corresponding destination computing device. It should be appreciated that, based on the digital media display capabilities of the corresponding destination computing device, the input digital media stream may be transmitted as-is (i.e., without transcoding). As described previously, in some embodiments, more than one input digital media stream may be received that is to be transmitted to one or more destination computing devices. In such embodiments, the transcoding of the data in block 704 may include composing a single stream that includes each input digital media stream, resulting in a single output digital media stream.

In block 708, the wireless retransmission hub 106 transmits the digital media streams (i.e., the output digital media streams), either transcoded or as-is, to the corresponding (i.e., selected) destination computing devices. In block 710, the wireless retransmission hub 106 determines whether to end transmission of the output digital media streams. It should be appreciated that the wireless retransmission hub 106 may make the determination to end transmission of the output digital media streams based on various conditions, such as having received an indication from the source computing device that the transmission of the digital media stream has ended, determining the source computing device is no longer connected to the wireless retransmission hub 106, determining the destination computing device is no longer connected to the wireless retransmission hub 106, etc.

If the wireless retransmission hub 106 determines to end transmission of the output digital media streams, the method 700 advances to block 712, in which the wireless retransmission hub 106 transmits a notification to the corresponding destination devices indicating the retransmission has ended; otherwise, the method 700 returns to block 702 to determine whether digital media was received for retransmission.

It should be appreciated that at least a portion of the methods 500, 600, and 700 may be embodied as various instructions stored on a computer-readable media, which may be executed by the processor 302, the communication circuitry 310, and/or other components of the wireless retransmission hub 106 to cause the wireless retransmission hub 106 to perform the methods 500, 600, and 700. The computer-readable media may be embodied as any type of media capable of being read by the wireless retransmission hub 106 including, but not limited to, the memory 306, the data storage device 308, a local memory of a NIC (not shown) of the communication circuitry 310, other memory or data storage devices of the wireless retransmission hub 106, portable media readable by a peripheral device of the wireless retransmission hub 106, and/or other media.

EXAMPLES

Illustrative examples of the technologies disclosed herein are provided below. An embodiment of the technologies may include any one or more, and any combination of, the examples described below.

Example 1 includes a wireless retransmission hub for wireless transmission of digital media, the wireless retransmission hub comprising a digital media stream reception module to receive an input digital media stream from a source computing device, wherein the input digital media stream includes digital media; a source computing device management module to (i) transmit a list of available destination computing devices to the source computing device, wherein the list of available destination computing devices includes a plurality of connected destination computing devices connected to the wireless retransmission hub that are available to receive a digital media stream from the source computing device, (ii) receive, in response to transmission of the list of available destination computing devices, a list of selected destination computing devices from the source computing device, and (iii) map each of the destination computing devices of the list of selected destination computing devices to the source computing device; a digital media stream transmission module to transmit an output digital media stream to each of the selected destination computing devices of the list of selected destination computing devices, wherein the output digital media stream includes the digital media of the input digital media stream.

Example 2 includes the subject matter of Example 1, and wherein to transmit the output digital media stream comprises to (i) transcode the input digital media stream into the output digital media stream and (i) transmit the transcoded output digital media stream to each of the selected destination computing devices.

Example 3 includes the subject matter of any of Examples 1 and 2, and wherein to transcode the input digital media stream into the output digital media stream comprises to transcode the input digital media stream into a plurality of output digital media streams, wherein each of the plurality of output digital media streams is transcoded based on one or more digital media display capabilities of a corresponding one of the selected destination computing devices.

Example 4 includes the subject matter of any of Examples 1-3, and further including a communication management module to connect to a detected destination computing device, wherein the detected destination computing device is not presently connected to the wireless retransmission hub; and a destination computing device management module to retrieve digital media display capabilities from the detected destination computing device.

Example 5 includes the subject matter of any of Examples 1-4, and wherein the digital media display capabilities includes at least one of supported video codecs, supported resolutions, network port numbers, processor specifications, and memory specifications.

Example 6 includes the subject matter of any of Examples 1-5, and wherein the destination computing device management module is further to update a list of connected destination computing devices to include the detected destination computing device, wherein the list of connected destination computing devices identifies the plurality of connected destination computing devices.

Example 7 includes the subject matter of any of Examples 1-6, and wherein the source computing device management module is further to determine the plurality of connected destination computing devices available to receive the digital media stream from the source computing device based on the list of connected destination computing devices.

Example 8 includes the subject matter of any of Examples 1-7, and further including a communication management module to (i) connect to the source computing device and (ii) collect connection information from the source computing device.

Example 9 includes the subject matter of any of Examples 1-8, and wherein the connection information comprises at least one of an IP address, a port number, access credentials, and a session key.

Example 10 includes the subject matter of any of Examples 1-9, and wherein to transmit the output digital media stream that includes the digital media of the input digital media stream comprises to transmit the output digital media stream either unchanged or transcoded.

Example 11 includes a method for wireless transmission of digital media, the method comprising receiving, by a wireless retransmission hub, an input digital media stream from a source computing device, wherein the input digital media stream includes digital media; transmitting, by the wireless retransmission hub, a list of available destination computing devices to the source computing device, wherein the list of available destination computing devices includes a plurality of connected destination computing devices connected to the wireless retransmission hub that are available to receive a digital media stream from the source computing device; receiving, by the wireless retransmission hub and in response to transmitting the list of available destination computing devices, a list of selected destination computing devices from the to the source computing device; mapping, by the wireless retransmission hub, each of the destination computing devices of the list of selected destination computing devices to the source computing device; and transmitting, by the wireless retransmission hub, an output digital media stream to each of the selected destination computing devices of the list of selected destination computing devices, wherein the output digital media stream includes the digital media of the input digital media stream.

Example 12 includes the subject matter of Example 11, and wherein transmitting the output digital media stream comprises (i) transcoding the input digital media stream into the output digital media stream and (i) transmitting the transcoded output digital media stream to each of the selected destination computing devices.

Example 13 includes the subject matter of any of Examples 11 and 12, and wherein transcoding the input digital media stream into the output digital media stream comprises transcoding the input digital media stream into a plurality of output digital media streams, wherein each of the plurality of output digital media streams is transcoded based on one or more digital media display capabilities of a corresponding one of the selected destination computing devices.

Example 14 includes the subject matter of any of Examples 11-13, and further including connecting, by the wireless retransmission hub, to a detected destination computing device, wherein the detected destination computing device is not presently connected to the wireless retransmission hub; and retrieving, by the wireless retransmission hub, digital media display capabilities from the detected destination computing device.

Example 15 includes the subject matter of any of Examples 11-14, and wherein retrieving the digital media display capabilities comprises retrieving at least one of supported video codecs, supported resolutions, network port numbers, processor specifications, and memory specifications.

Example 16 includes the subject matter of any of Examples 11-15, and further including updating a list of connected destination computing devices to include the detected destination computing device, wherein the list of connected destination computing devices identifies the plurality of connected destination computing devices.

Example 17 includes the subject matter of any of Examples 11-16, and further including determining the plurality of connected destination computing devices available to receive the digital media stream from the source computing device based on the list of connected destination computing devices.

Example 18 includes the subject matter of any of Examples 11-17, and further including connecting to the source computing device; and collecting connection information from the source computing device.

Example 19 includes the subject matter of any of Examples 11-18, and wherein collecting the connection information comprises collecting at least one of an IP address, a port number, access credentials, and a session key.

Example 20 includes the subject matter of any of Examples 11-19, and wherein transmitting the output digital media stream that includes the digital media of the input digital media stream comprises transmitting the output digital media stream either unchanged or transcoded.

Examples 21 includes a wireless retransmission hub comprising a processor; and a memory having stored therein a plurality of instructions that when executed by the processor cause the wireless retransmission hub to perform the method of any of Examples 11-20.

Example 22 includes one or more machine readable storage media comprising a plurality of instructions stored thereon that in response to being executed result in a wireless retransmission hub performing the method of any of Examples 11-20.

Example 23 includes a wireless retransmission hub comprising means for performing the method of any of Examples 11-20.

Example 24 includes a wireless retransmission hub for wireless transmission of digital media, the wireless retransmission hub comprising means for receiving, by a wireless retransmission hub, an input digital media stream from a source computing device, wherein the input digital media stream includes digital media; means for transmitting, by the wireless retransmission hub, a list of available destination computing devices to the source computing device, wherein the list of available destination computing devices includes a plurality of connected destination computing devices connected to the wireless retransmission hub that are available to receive a digital media stream from the source computing device; means for receiving, by the wireless retransmission hub and in response to transmitting the list of available destination computing devices, a list of selected destination computing devices from the to the source computing device; means for mapping, by the wireless retransmission hub, each of the destination computing devices of the list of selected destination computing devices to the source computing device; and means for transmitting, by the wireless retransmission hub, an output digital media stream to each of the selected destination computing devices of the list of selected destination computing devices, wherein the output digital media stream includes the digital media of the input digital media stream.

Example 25 includes the subject matter of Example 24, and wherein the means for transmitting the output digital media stream comprises means for (i) transcoding the input digital media stream into the output digital media stream and (i) transmitting the transcoded output digital media stream to each of the selected destination computing devices.

Example 26 includes the subject matter of any of Examples 24 and 25, and wherein the means for transcoding the input digital media stream into the output digital media stream comprises means for transcoding the input digital media stream into a plurality of output digital media streams, wherein each of the plurality of output digital media streams is transcoded based on one or more digital media display capabilities of a corresponding one of the selected destination computing devices.

Example 27 includes the subject matter of any of Examples 24-26, and further including means for connecting, by the wireless retransmission hub, to a detected destination computing device, wherein the detected destination computing device is not presently connected to the wireless retransmission hub; and means for retrieving, by the wireless retransmission hub, digital media display capabilities from the detected destination computing device.

Example 28 includes the subject matter of any of Examples 24-27, and wherein the means for retrieving the digital media display capabilities comprises means for retrieving at least one of supported video codecs, supported resolutions, network port numbers, processor specifications, and memory specifications.

Example 29 includes the subject matter of any of Examples 24-28, and further including means for updating a list of connected destination computing devices to include the detected destination computing device, wherein the list of connected destination computing devices identifies the plurality of connected destination computing devices.

Example 30 includes the subject matter of any of Examples 24-29, and further including means for determining the plurality of connected destination computing devices available to receive the digital media stream from the source computing device based on the list of connected destination computing devices.

Example 31 includes the subject matter of any of Examples 24-30, and further including means for connecting to the source computing device; and means for collecting connection information from the source computing device.

Example 32 includes the subject matter of any of Examples 24-31, and wherein the means for collecting the connection information comprises means for collecting at least one of an IP address, a port number, access credentials, and a session key.

Example 33 includes the subject matter of any of Examples 24-32, and wherein the means for transmitting the output digital media stream that includes the digital media of the input digital media stream comprises means for transmitting the output digital media stream either unchanged or transcoded.

The invention claimed is:

1. A wireless retransmission hub for wireless transmission of digital media, the wireless retransmission hub comprising:
a digital media stream reception module to receive an input digital media stream from a source computing device, wherein the input digital media stream includes digital media;
a source computing device management module to (i) transmit a list of available destination computing devices to the source computing device, wherein the list of available destination computing devices includes a plurality of connected destination computing devices connected to the wireless retransmission hub that are available to receive a digital media stream from the source computing device, (ii) receive, in response to transmission of the list of available destination computing devices, a list of selected destination computing devices from the source computing device, and (iii) map each of the destination computing devices of the list of selected destination computing devices to the source computing device;
a destination computing device management module to retrieve digital media display capabilities from the each of the selected destination computing devices; and
a digital media stream transmission module to (i) identify an amount of digital media streams to output based on a total number of the selected destination computing devices that have different digital media display capabilities, wherein at least two of the selected destination computing devices have different digital media display capabilities, (ii) transcode the input digital media stream into a plurality of transcoded digital media streams based on the amount of digital media streams to output, wherein each of the plurality of transcoded digital media streams is transcoded based on a corresponding one of the different digital media display capabilities, and (ii) transmit a transcoded digital media stream of the plurality of transcoded digital media streams to a corresponding one of the selected destination computing devices for which that transcoded digital media stream was transcoded.

2. The wireless retransmission hub of claim 1, further comprising:
a communication management module to connect to a detected destination computing device, wherein the detected destination computing device is not presently connected to the wireless retransmission hub the destination computing device management module is further to retrieve digital media display capabilities from the detected destination computing device.

3. The wireless retransmission hub of claim 1, wherein the one or more digital media display capabilities includes at least one of supported video codecs, supported resolutions, network port numbers, processor specifications, and memory specifications.

4. The wireless retransmission hub of claim 2, wherein the destination computing device management module is further to update a list of connected destination computing devices to include the detected destination computing device, wherein the list of connected destination computing devices identifies the plurality of connected destination computing devices.

5. The wireless retransmission hub of claim 4, wherein the source computing device management module is further to determine whether the digital media display capabilities of the detected destination computing device is different from the digital media display capabilities of any of the plurality of connected destination computing devices presently receiving one of the transcoded digital media streams, and wherein the digital media stream transmission module is further to (i) transcode, in response to a determination that the digital media display capabilities of the detected destination computing device are different from the digital media display capabilities of any of the plurality of connected destination computing devices, the input digital media stream into an additional transcoded digital media streams based on the digital media display capabilities of the detected destination computing device and (ii) transmit the additional transcoded digital media stream to the detected destination computing devices.

6. The wireless retransmission hub of claim 1, further comprising a communication management module to (i) connect to the source computing device and (ii) collect connection information from the source computing device.

7. The wireless retransmission hub of claim 6, wherein the connection information comprises at least one of an IP address, a port number, access credentials, and a session key.

8. One or more non-transitory, machine-readable storage media comprising a plurality of instructions stored thereon that, in response to execution by a wireless retransmission hub, cause the wireless retransmission hub to:

receive an input digital media stream from a source computing device, wherein the input digital media stream includes digital media;

transmit a list of available destination computing devices to the source computing device, wherein the list of available destination computing devices includes a plurality of connected destination computing devices connected to the wireless retransmission hub that are available to receive a digital media stream from the source computing device;

receive, in response to transmission of the list of available destination computing devices, a list of selected destination computing devices from the source computing device;

map each of the destination computing devices of the list of selected destination computing devices to the source computing device;

retrieve digital media display capabilities from the each of the selected destination computing devices;

identify an amount of digital media streams to output based on a total number of the selected destination computing devices that have different digital media display capabilities, wherein at least two of the selected destination computing devices have different digital media display capabilities;

transcode the input digital media stream into a plurality of transcoded digital media streams based on the amount of digital media streams to output, wherein each of the plurality of transcoded digital media streams is transcoded based on a corresponding one of the different digital media display capabilities; and transmit a transcoded digital media stream of the plurality of transcoded digital media streams to a corresponding one of the selected destination computing devices for which that transcoded digital media stream was transcoded.

9. The one or more non-transitory, machine-readable storage media of claim 8, wherein the plurality of instructions further cause the wireless retransmission hub to:

connect to a detected destination computing device, wherein the detected destination computing device is not presently connected to the wireless retransmission hub; and retrieve digital media display capabilities from the detected destination computing device.

10. The one or more non-transitory, machine-readable storage media of claim 8, wherein the one or more digital media display capabilities includes at least one of supported video codecs, supported resolutions, network port numbers, processor specifications, and memory specifications.

11. The one or more non-transitory, machine-readable storage media of claim 9, wherein the plurality of instructions further cause the wireless retransmission hub to update a list of connected destination computing devices to include the detected destination computing device, wherein the list of connected destination computing devices identifies the plurality of connected destination computing devices.

12. The one or more non-transitory, machine-readable storage media of claim 11, wherein the plurality of instructions further cause the wireless retransmission hub to determine whether the digital media display capabilities of the detected destination computing device is different from the digital media display capabilities of any of the plurality of connected destination computing devices presently receiving one of the transcoded digital media streams, and wherein the digital media stream transmission module is further to (i) transcode, in response to a determination that the digital media display capabilities of the detected destination computing device are different from the digital media display capabilities of any of the plurality of connected destination computing devices, the input digital media stream into an additional transcoded digital media streams based on the digital media display capabilities of the detected destination computing device and (ii) transmit the additional transcoded digital media stream to the detected destination computing devices.

13. The one or more non-transitory, machine-readable storage media of claim 8, wherein the plurality of instructions further cause the wireless retransmission hub to:

connect to the source computing device; and collect connection information from the source computing device.

14. The one or more non-transitory, machine-readable storage media of claim 13, wherein the connection information comprises at least one of an IP address, a port number, access credentials, and a session key.

15. A method for wireless transmission of digital media, the method comprising:

receiving, by a wireless retransmission hub, an input digital media stream from a source computing device, wherein the input digital media stream includes digital media;

transmitting, by the wireless retransmission hub, a list of available destination computing devices to the source computing device, wherein the list of available destination computing devices includes a plurality of connected destination computing devices connected to the wireless retransmission hub that are available to receive a digital media stream from the source computing device;

receiving, by the wireless retransmission hub and in response to transmitting the list of available destination computing devices, a list of selected destination computing devices from the to the source computing device;

mapping, by the wireless retransmission hub, each of the destination computing devices of the list of selected destination computing devices to the source computing device;

retrieving, by the wireless retransmission hub, digital media display capabilities from the each of the selected destination computing devices;

identifying, by the wireless retransmission hub, an amount of digital media streams to output based on a total number of the selected destination computing devices that have different digital media display capabilities, wherein at least two of the selected destination computing devices have different digital media display capabilities;

transcoding, by the wireless retransmission hub, the input digital media stream into a plurality of transcoded digital media streams based on the amount of digital media streams to output, wherein each of the plurality of transcoded digital media streams is transcoded based on a corresponding one of the different digital media display capabilities; and transmitting, by the wireless retransmission hub, a transcoded digital media stream of the plurality of transcoded digital media streams to a corresponding one of the selected destination computing devices for which that transcoded digital media stream was transcoded.

16. The method of claim 15, further comprising:

connecting, by the wireless retransmission hub, to a detected destination computing device, wherein the detected destination computing device is not presently connected to the wireless retransmission hub; and retrieving, by the wireless retransmission hub, digital media display capabilities from the detected destination computing device.

17. The method of claim 16, further comprising updating a list of connected destination computing devices to include the detected destination computing device, wherein the list of connected destination computing devices identifies the plurality of connected destination computing devices.

18. The method of claim 15, wherein transcoding the input digital media stream comprises transcoding the input digital media stream based on at least one of a supported video codec, a supported resolution, a network port number, a processor specification, and a memory specification.

* * * * *